United States Patent [19]
Rasmussen, Jr.

[11] 3,721,825
[45] March 20, 1973

[54] METHOD AND APPARATUS FOR ANALYSIS OF LIQUID RESIDUES USING NUCLEAR REACTIONS

[76] Inventor: John Oscar Rasmussen, Jr., 207 Armory Street, Hamden, Conn. 06511

[22] Filed: Dec. 3, 1970

[21] Appl. No.: 94,829

[52] U.S. Cl.........250/83.3 R, 250/43.5 MR, 250/84, 250/106 S, 250/106 SC
[51] Int. Cl..................................................G01t 1/16
[58] Field of Search............250/83.1, 84, 86, 106 S, 250/106 SC, 106 T, 43.5 MR, 83.3 R

[56] References Cited

UNITED STATES PATENTS

| | | |
|---|---|---|
| 2,826,076 | 3/1958 | Boretz et al.................250/106 SC X |
| 3,009,062 | 11/1961 | Brooksbank, Jr. et al...........250/83.1 |
| 3,092,723 | 6/1963 | Payne et al..................250/106 SC X |
| 3,200,252 | 8/1965 | Moses et al. .................250/106 SC X |
| 3,247,380 | 4/1966 | Amiel et al....................250/106 T X |
| 3,383,510 | 5/1968 | Sellers..........................250/106 S X |
| 3,448,269 | 6/1969 | Dieval et al...............250/43.5 MR X |

Primary Examiner—Archie R. Borchelt
Attorney—John J. Posta, Jr.

[57] ABSTRACT

Herein described is the method and apparatus for irradiating a liquid residue sample with alpha particles and detecting the protons liberated from the nuclei of sample constituents. Pulse height energy analysis of detected protons provides characteristic signatures indicative of certain elements contained in the sample. The energy of the alpha particle source and the thickness of the sample are selected to reduce interfering signatures. A tape transport mechanism incorporated into one preferred embodiment allows the retention of samples for subsequent additional testing and provides a permanent record. Means are provided for automatically performing the analysis, for controlling processing systems in response thereto and/or for telemetering the analysis data to a remotely located processing or record center.

32 Claims, 8 Drawing Figures

METHOD AND APPARATUS FOR ANALYSIS OF LIQUID RESIDUES USING NUCLEAR REACTIONS

BACKGROUND OF THE INVENTION

1. Field of the Invention

This invention relates generally to a device for liquid residue analysis using nuclear reactions, and more particularly to the novel and improved method and apparatus for irradiating liquid residue with alpha particles and for identifying constituent elements in the sample as a function of detected protons produced by the irradiation. The invention is particularly useful in the remote automatic telemetered data gathering of liquid samples, as for example, in pollution control applications.

2. Discussion of the Prior Art

There is an increasing need in water quality analysis and sewage processing to obtain a safe, accurate and reliable quantitative analysis of the chemical constituents therein. Wet chemistry, while continually being improved and being quite acceptable for some applications, has several severe limitations in other applications, such as extensive processing times and questionable quantitative accuracy. Colorimetry techniques are subject to various interference problems.

With the ever increasing scope of water pollution problems, the traditional quantitative analysis techniques are proving increasingly inconvenient and/or inadequate. Many of the prior art techniques do not lend themselves to automated operation and few are adaptable to "in-line" process control such as, for example, optimizing sewage processing.

It is particularly important for the maintenance of the quality of fresh water streams, to monitor the level of nitrogen and phosphorus compounds, since these concentrations affect the growth of algae and other plant life. Heavy loading of these nutrient elements may enter fresh water streams from agricultural runoff, carrying dissolved agricultural chemical fertilizers, or from sewage treatment plants through which pass phosphate-containing detergents.

The monitoring of nitrogen and phosphorus concentrations is also important relative to estuarine and ocean waters as the fertilization of sea water for phytoplankton at the lower end of the food chain is dependent upon these nutrients.

Recent studies have shown the possibility for optimizing secondary sewage processing through the use of nitrogen and phosphorus concentrations as control indicators for aeration.

Although the monitoring of nitrogen and phosphorus concentrations may be most important for applications such as water pollution control and sewage processing, the subject invention is also directly applicable to a wide range of other critically important water analysis applications. For example, a select few of the other applications are the monitoring of:

fluoride relative to the retardation of certain types of tooth damage;

boron and sodium levels in irrigation waters; and magnesium and aluminum as indicators of water "-hardness" in industrial processing applications.

As is evident from developments in the field of automated wet chemical methods of liquid residue analysis, such as outlined in U.S. Pat. Nos. 3,036,893, 3,080,218 and 3,186,799, great ingenuity has been applied to this area of technology. Also it has been proposed that in certain applications, selected elements may be quantitatively analyzed by the detection of gamma emissions from isotopes naturally present in the samples, as disclosed in U.S. Pat. No. 3,332,744; and atomic spectrophotometry is applicable to other types of sample analysis as taught in U.S. Pat. No. 3,469,438.

SUMMARY OF THE INVENTION

It is perhaps the recognition of the ingenuity and complexity of the prior art devices which lead to the conclusion that these approaches are reaching the point of diminishing returns, and that to realistically deal with the ecological problems of liquid (water and sewage, for example), quality control presently facing society, a completely new and unique approach is mandatory. In search of such a new solution the techniques developed by Turkevich and associates and used in obtaining the first chemical analysis of the moon during the surveyor series of instrumented soft landings were considered relative to the problem of the analysis of various light element residues obtained from liquid and sludge samples. The lunar sample device is described in a paper by Turkevich, Patterson, Franzgrote, entitled "Chemical analysis of the moon at surveyor VI landing site, preliminary results, Journal of Geophysical Research, Mar. 15, 1965".

The recognition of the feasibility of applying the lunar proton detection techniques to the quantitative analysis of liquid residue samples is a significant aspect of the subject invention. The application of alpha particle nuclear analysis to liquid residue samples required overcoming numerous problems such as those associated with atmospheric interference (the lunar device operated in a vacuum); and in recognizing the interacting effects of sample thickness and alpha particle source energy levels on proton analysis of liquid residue samples. Further it should be noted that the lunar device was applied to thick samples in which distinct proton energy peaks were smeared.

Briefly, the subject invention comprises the method and apparatus for irradiating a liquid residue sample with alpha particles and detecting the protons liberated from the nuclei of the sample constituents. Pulse height energy analysis of detected protons provides characteristic signatures indicative of certain elements comprising the sample. According to one preferred embodiment of the subject invention, the liquid to be analyzed is applied to a tape, and transported to a position juxtaposed to the source of irradiating alpha particles. Means are provided for automatically telemetering the analysis data and/or controlling processing systems in response to measured concentrations; and means are further provided for storing the tape containing the sample residue for subsequent additional analysis and for a permanent record such as for example, for legal evidence.

The present invention provides an improved method and apparatus for quantitatively analyzing liquid residues which is adaptable to automatic telemetering of data which identifies certain light elements contained within a liquid sample.

A feature of this invention is that it provides a method and the apparatus for "in line" automatic process control based upon the level of certain indicator elements in the liquid being processed with the relative concentrations of the elements being determined by nuclear reactions induced by alpha particle excitation.

The invention provides a monitoring water system which includes the capability for readily telemetering data from remote locations and for providing a permanent record of samples correlated to the telemetered data, for subsequent analysis.

BRIEF DESCRIPTION OF THE DRAWINGS

These and other features and advantages will become more apparent to those skilled in the art when taken into consideration with the following detailed description wherein like references indicate like and corresponding parts throughout the several views and wherein.

DESCRIPTION OF THE PREFERRED EMBODIMENT

Figures 1, 2:
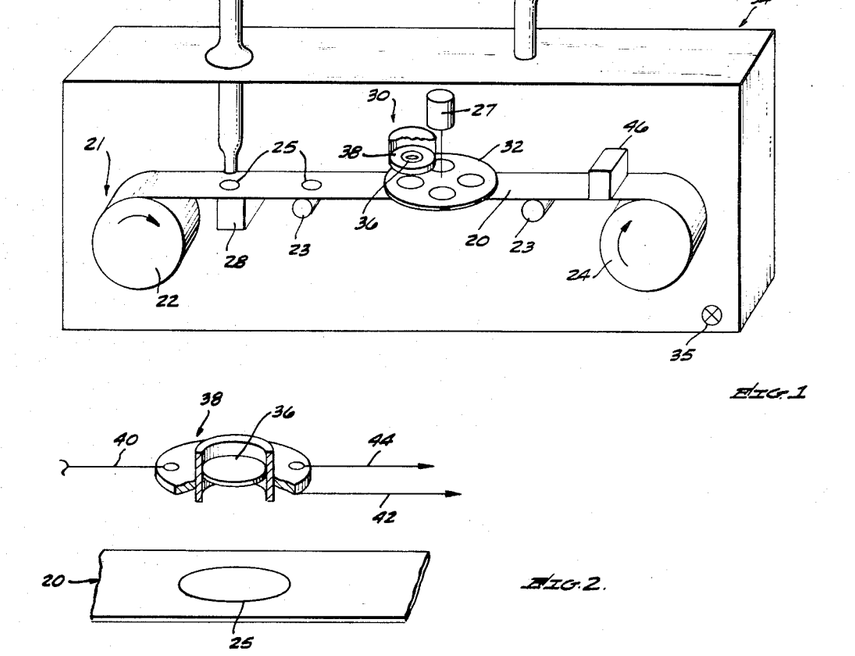
FIG. 1 shows one preferred mechanization of the nuclear alpha particle method in accordance with the principles of the subject invention.
FIG. 2 is a top plan view, partially broken away, of an alpha particle emitter and proton detector device suitable for incorporation into the apparatus of FIG. 1.

Turning now to the drawings, FIG. 1 shows the mechanization of the nuclear alpha particle method of the subject invention as applied to the automatic analysis of residues from liquid samples. The device shown in FIG. 1 may be stationed remotely and operated automatically with only periodic maintenance required. As shown in FIG. 1, a tape 20 is positioned by a tape transport mechanism 21 which includes a feed reel 22, a takeup reel 24 and positioning rollers 23. A fresh tape roll need be inserted into the system only during periodic maintenance periods, and depending upon sample rates, tape reels could provide the requirements of remote unattended sample analysis for periods of months.

Liquid samples 25 are supplied through a tube 26 and atomized or drop-deposited on the tape 20 above a heater element 28. Heater 28 may be eliminated in certain applications depending upon the sampling rate and on whether or not the sample is deposited by an atomizing technique. As will be explained hereinafter, the thickness of the sample is important, and hence the deposition technique should be one suitable for applying samples of uniform preselected thickness.

Tape 20 proceeds from left to right as shown in FIG. 1 in small incremental steps in response to a stepper motor (not shown) driving takeup reel 24. The sample, after being dried on the tape 20, is fed into a position juxtaposed to an alpha particle source and detector unit 30.

The sample is irradiated and proton energy level counts are taken for periods depending upon the sensitivity desired, for example 5 to 25 minutes.

A selectable alpha particle absorber foil is disposed between element 30 and tape 20, and is positionable in response to a stepper motor 27. The function of this absorber will be explained hereinafter, however it is noted that in the less sophisticated versions of the liquid residue analysis system, it may be eliminated.

Pulse height analysis of the output signals of the detector portion of the element 30 as will be explained subsequently, may be performed by either multiple channel or low-cost single channel pulse height analyzers.

For the more sophisticated embodiments of the subject invention, gas purging is provided by tubing 33 whereby the analyzer is purged of atmospheric gasses through the use of carbon dioxide, methane or other suitable gasses. Purging valve 35 provides an outlet for the exhausted atmospheric gasses.

The automatic liquid residue sensor device shown in FIG. 1 may be packaged within a container 34 which could be less than 10 inches in length, 3 inches in width and 4 inches in height, for example.

One of the more essential component portions of the analysis device of FIG. 1 is shown in greater detail in FIG. 2. Referring now primarily to FIG. 2, a radioactive isotope such as curium 242 or 244 is utilized as alpha particle emitter 36. The emitter 36 may be in the form of a small button sealed and coated with gold, and disposed concentrically within an annular silicon surface barrier detector 38. The configuration, geometry and shielding of the emitter and detector are such to protect the detector from direct radiation from alpha particle source 36.

The liquid residue sample 25 is transported on the tape 20 to a position directly under alpha particle emitter 36 which is centrally located within silicon surface barrier detector 38.

The energy of the alpha particles emitted from source 36 may be, for example, approximately 6 million electron volts (MEV). These alpha particles impinge upon the constituent elements of residue sample 25 producing nuclear reactions in certain of the lighter elements. Protons are emitted from the elements being bombarded in the nuclear reaction process, and the energy of the liberated protons is directly related to the element nucleus from which they came. One important aspect of the subject invention is the recognition of the fact that with 6 MEV energy alpha particles, it is energetically impossible for elements such as hydrogen, carbon and oxygen to liberate protons, and hence filter paper may be used for tape 20. For elements above calcium, the coulombic repulsion of the nuclear charge is sufficient to prevent nuclear reactions.

The liberated protons impinge upon the surface barrier detector 38 and produce charge pulses, the amplitude of which are proportional to the energy level of the striking protons. Thus each detector current pulse is representative of the proton energy which produced it. Detector 38 is appropriately back biased for optional energy resolution. As shown in FIG. 2, this bias is applied between leads 40 and 42, and the output pulses are applied on leads 42 and 44, though such details on electrical connections may vary with particular detectors.

Figure 3:
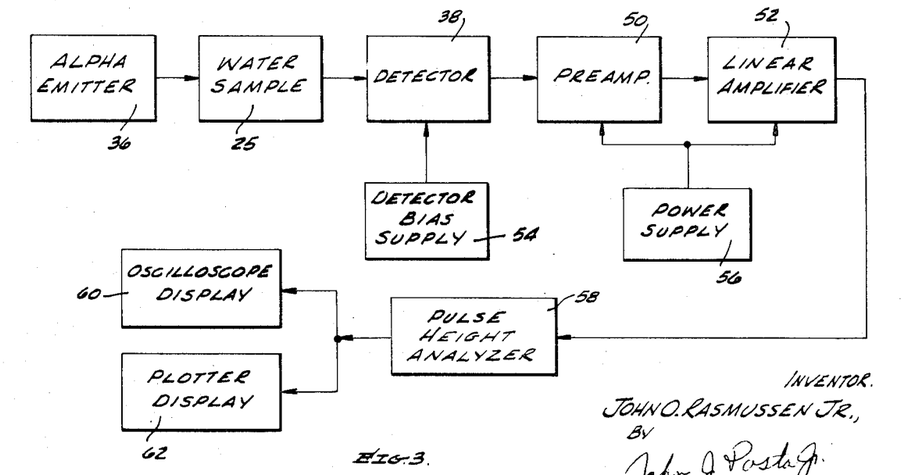
FIG. 3 is a block diagram of a system for the analysis of the liquid residue, including an illustration of a method for processing output pulses from the proton detector of FIG. 2.

FIG. 3 shows in block diagram form a complete system for the analysis of liquid residue samples, and illustrates one processing technique for determining the qualitative data from the output signals from detector 38. As shown in FIG. 3 the output signals from detector 38 are applied to a charge preamplifier 50 and thence to a linear amplifier 52. Bias and power supply voltages are applied from supplies 54 and 56 to detector 38, and to amplifiers 50 and 52, respectively. The output signals from amplifier 52 are fed to a pulse height analyzer 58 wherein the small incremental differences in amplitudes are distinguished and the resulting data stored in memory units contained therein. The number of channels, i.e., the resolution between amplitude ranges, determines the accuracy of the analysis and a 200 channel analyzer has been determined to be sufficient for most applications. The output signals read out from the memory units of analyzer 58 are displayed on an oscilloscope 60 and a plotter 62.

A mechanical analog to the electronic pulse height analyzer 58 is a series of 200 storage bins in which a group of steel balls of various sizes are to be sorted and accumulated. The size of each ball represents the height of a given pulse from detector 38. Each of the 200 bins will accept only balls of one diameter with small positive and negative tolerance graded from 0.005 inch diameter to 1 inch diameter. Suppose the analogous steel ball sorter sorted 10,000 steel balls between 0.005 inch and 1 inch in diameter. Diameter differences between 0.005 inch and 1 inch would be broken into 200 equal incremental parts. It would be possible, after all balls had been sorted and dropped into the proper bin, to count the number of balls in each bin and to establish the distribution. Characteristics of ball production could be established by this distribution.

Similarly, the characteristic of the proton source (nuclei of sample elements) is determined by the sorting of electrical pulses. The count storage, rather than adding balls to bins, is performed in electronic memories. The number of counts in each channel is repeatedly interrogated with a sampling circuit. The count in each channel is displayed on oscilloscope 60 and/or plotter 62.

Figure 7:
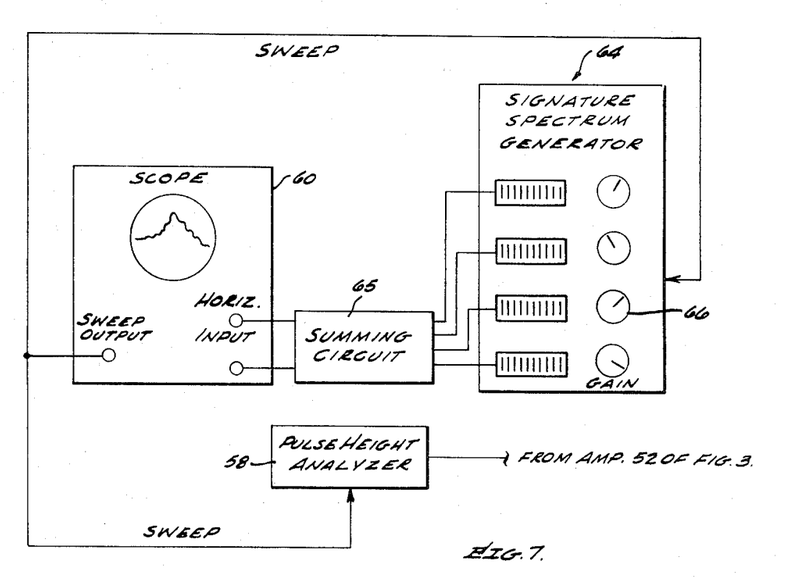
FIG. 7 shows a system and method for the analysis of characteristic proton signatures derived from the detector device of FIG. 2.
Figure 8:
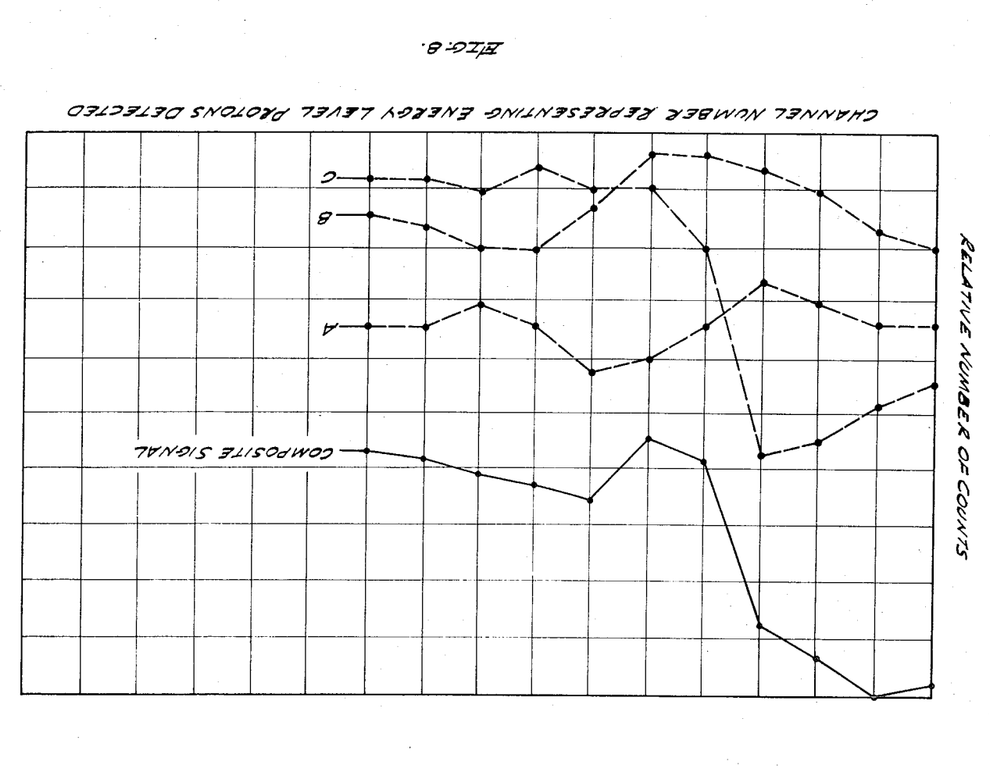
FIG. 8 is a graph of proton counts versus channel number (proton energy range) for explaining the method of analyzing the proton spectra of the subject invention.

FIGS. 7 and 8 illustrate one method of a nulling technique which may be used to establish the individual constituent alements in a composite signal sample being analyzed. For illustrative purposes, the characteristic signatures of elements A, B and C (FIG. 8) have been deliberately exaggerated. Composite signal 39 represents the sum of the signatures of A, B and C elements applied from detector 38. The analytical task, then, is to effectively separate and quantitatively establish the values of the constitutuent elements A, B and C from the composite curve. The analysis is simplified by the knowledge of the characteristic curves of the major constitutuent elements previously measured under laboratory conditions. In the nulling analysis method, the characteristic signatures of A, B and C are inserted inversely so as to subtract electronically from the composite. The output is displayed on oscilloscope 60. The operator adjusts the gain values (control 66) of the inverse signatures A, B and C until he achieves the best null condition. The gain value of the inverse inputs are then a quantitative measure of each of the elements present. A residual signal remaining after the best nulling has been achieved indicates either that additional components are present in the composite or that an inadequate nulling job has been achieved on the principal elements. The iterative process of nulling can provide a highly accurate quantitative analysis of the elements present.

FIG. 7 shows equipment suitable for the above described visual nulling technique. As shown in FIG. 7, a signature spectrum generator 64 with a capacity to generating a plurality of inverse spectra is coupled to a summing circuit 65. Spectrum generator 64 has gain control adjustments such as 66, to effect the signal nulling. The sweep from oscilloscope 60 is applied concurrently to the spectrum generator 64 and pulse height analyzer 58. The composite output signal from the pulse height analysis is summed in the unit 65 with the inverse spectra from generator 64. The difference signal is applied to the vertical input terminals of oscilloscope 60. The sweep rate is adjusted to be compatible with both analyzer 58 and generator 64.

The individual element spectrum signals may be generated electronically with unit 64 by use of a digital spectrum synthesizer, or the signals could be produced mechanically by the use of cams whose rise and fall correspond to the spectral characteristics of the element to be analyzed. It should be noted that mechanical systems are suitable due to the fact that there is no requirement for rapid sweep speeds in the nulling analysis method.

Figure 4A:
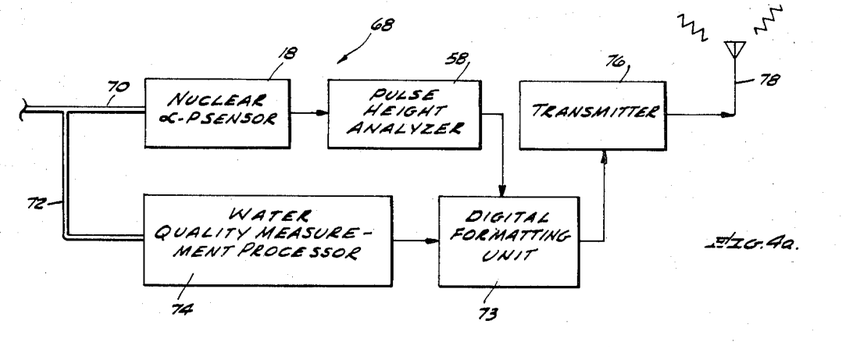
FIGS. 4a and 4b are block diagrams of a system in accordance with the subject invention for monitoring the quality of water, such as would be used in a fresh water monitoring application.

FIG. 4a shows in block diagram form, a system 68 according to the method of the subject invention, adaptable to monitoring fresh water systems such as lakes, streams and rivers. As shown in FIG. 4a, water sampling tube 70 coveys the samples to nuclear alpha particle/proton sensor 18; and tube 72 provides samples to other sensors which measure pH, conduictivity, chlorine, dissolved oxygen, temperature and turbidity, for example, indicated generally by reference numeral 74. Unit 74 may include Geiger counters, alpha counters, scintillation counters and spectrometers, for example. Output signals from the sensor 18 are processed by pulse height analyzer 58, and the output therefrom is applied to digital formatting unit 73 wherein it is interleaved into a composite signal with the results of the other quality measurements of processors 74. The digital formatting unit 73 modulates a transmitter 76 which in turn excites antenna 78 for transmission of the data to a remotely located station, such as a central station 81 shown in FIG. 4b.

Figure 4B:
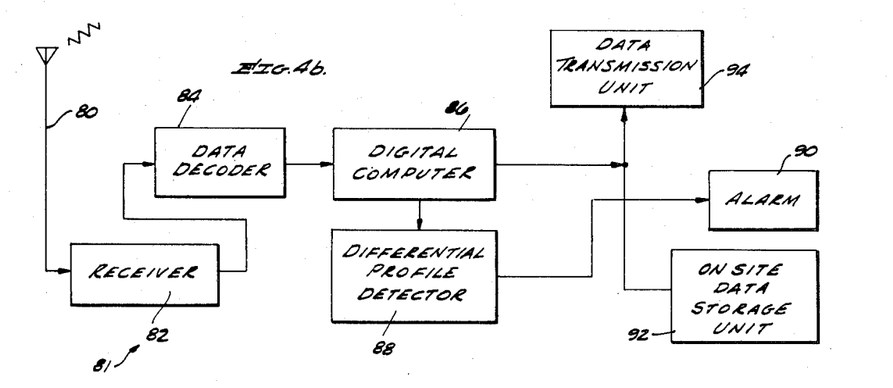

Referring now primarily to FIG. 4b, the signals transmitted from the remote station of FIG. 4a are received on an antenna 80, processed by a receiver 82 and data decoder 84. The output signal from unit 84 is applied to a special purpose digital computer 86 for quantitative analysis. For applications such as stream profile monitoring, the received data is applied from the computer 86 to a differential profile detector 88 wherein the data for certain selected constituent elements is compared against a normal stream profile, and any significant changes from the normal profile produce an output signal which activates an alarm 90. The output signal from computer 86 is also applied to an on-sight data storage unit 92 and is transmitted by data transmission unit 94 such as land lines, for example, to a main storage system.

Figure 5:
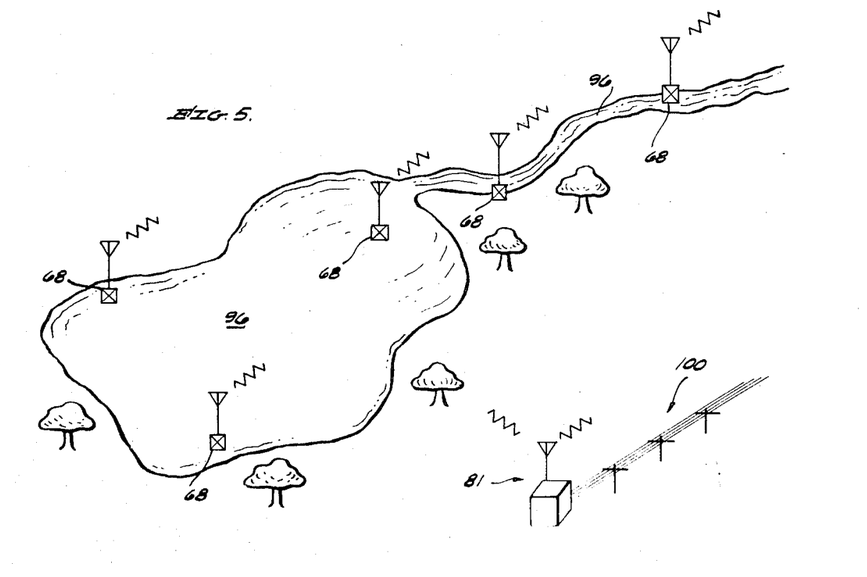
FIG. 5 depicts the arrangement of an automatic monitoring system for illustrating the stationing of a plurality of remote stations and the association between these stations, a central processing station and a main data storage system.

FIG. 5 illustrates the stationing of a plurality of remote water quality measurement units 68 relative to a lake 96 and its feeder stream 98. The data transmitted from each of the remote units 68 is processed by central data processing station 81. Some data is stored within station 81 and some data is transmitted on land lines 100 to a central data depository (not shown). As mentioned previously, station 81 also may detect changes in the stream's profile and trigger either a local or remote alarm indicator 90.

Figure 6:
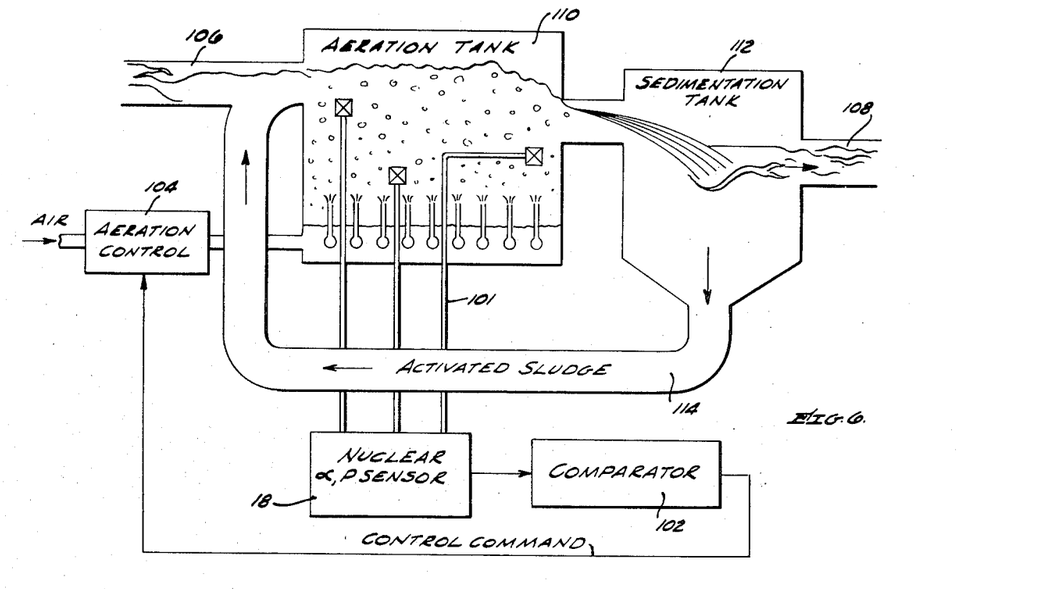
FIG. 6 illustrates the application of the method and apparatus of the subject invention is an "in line" process control application for a secondary sewage processing system.

FIG. 6 shows an activated sludge secondary sewage in-line process control system in accordance with the subject invention. As shown in FIG. 6, the sewage enters the system at an inlet port 106, is processed through aeration tank 110 and sedimentation tank 112, a portion thereof exits through an outlet port 108, and the remainder is recirculated through feed-back tube 114. Sampling ports such as 103, within the aeration tank 110 apply samples of the sewage from different points within the aeration tank to alpha particle sensor 18 by means of sampling tubes such as tube 101.

The analysis period (counting period) of sensor 18 may be 5 to 10 minutes, for example. Real time qualitative information is applied from the sensor 18 to comparator 102, this information being indicative of the relative concentrations of nitrate and phosphate present at the various sampling points within the aeration tank 110. The comparator 102 analyzes the nitrate and phosphate concentration against an optimized model and provides control signals to aeration control unit 104 so as to increase or decrease the air supplied to aeration tank 110 to maximize the rate of bacterial digestion of the sewage being processed.

It should be noted that the completeness of bacterial digestion is related to the rise of nitrate relative to reduced forms of nitrogen. Also nitrogen and phosphorus affect the bacterial digestion rate, and hence the measurement of these indicators could be used to control the addition of inexpensive sources of these elements into the sewage processing system for achieving a maximum rate of bacterial digestion of the sewage.

The equipment components comprising the nuclear alpha particle sensor of FIG. 1 are standard items commercially available. Alpha particle emitter 36 may be constructed by plating about 5 millicuries of curium 242 or 244 on the bottom of a small stainless steel cup about 4 mm in diameter with a lip of 2 mm. A protective coating of 100 micrograms per square centimeter of gold may be evaporated to the cup for preventing source flaking.

The source 36 is mounted in a centrally disposed opening on annular surface barrier silicon detector 38. A 300 micron depletion depth detector may be used to completely detect protons up to 6 MEV energy, the maximum energy encountered. An active surface area of a diameter of 14 mm may be used on the detector. The proton spectrum may be obtained with an 8 mg per sq. Cm absorber material over the detector annulus in order to absorb out back-scattered alpha particles while allowing the longer range protons to pass through.

Selectable alpha absorber foil 32 may comprise any suitable material not yielding protons such as thin nickel, gold or plastic foils. The filter 32 provides additional discrimination between certain selected elements within the sample by allowing the irradiation to be performed at different energy levels, and these levels may be selected on each side of a resonant energy plateau of a particular element of interest.

Preferably the samples are prepared so that a uniform deposit with a thickness of now more than 10 percent of the penetration range of the alpha particles is obtained. Samples may be prepared by evaporating aliquots sufficient to provide about 5 mg of residue over an area of 1 sq. Cm. For applications relating to drinking water, 5 mg of residue may be obtained from 7 to 20 cc of water.

Tape 20 may be constructed from mylar or metallic foil strip such as copper, or any noninterfering substance heavier than phosphorus, or graphite; and plastic or paper tape with carbon, hydrogen or oxygen elements may be used.

As mentioned previously relative to FIG. 2, the samples may be dried by evaporation, the deposition of the liquid on a hot metallic tape or by atomizing drops onto a hot surface.

Enclosure 34 of the nuclear alpha particle sensor 18 is constructed to allow gas purging for the elimination of interference from atmospheric nitrogen. This is accomplished by sweeping out the air from within the container with a small flow of methane or helium.

The effective range of alpha particles is reduced under normal atmospheric pressures, and to improve the sensitivity of the sensor it is desirable to have the detector 38 subtend a large solid angle relative to the sample. Hence it is desirable to have the spacing between unit 30 and the sample as small as possible.

Calibration of the analysis system of the subject invention may be obtained by determining the spectra from elements of interest under laboratory conditions and preprogramming the signatures therefrom into generator 64 (FIG. 7) or incorporating these signatures into the program of computer 86 (FIG. 4b). Conversion of the analysis results to mg/l of the parent liquid source requires that the total dissolved solids in the liquid be more or less constant between calibration periods. For applications where a more accurate absolute value of the constituent elements is desired, the parent water samples may be spiked with known reference amounts of some elements not normally present therein, for example, lithium or boron. This spiking may be mechanized by means of a mixing valve (not shown) incorporated into the liquid feed system prior to input tube 26 (FIG. 1).

Interfering ions such as magnesium or aluminum may be removed from the liquid sample 25 through action exchange resin prior to evaporation or ion separation through electrodialysis may be employed.

In summary, in the operation of sensor 18 of the subject invention, the sample 25 is uniformly deposited on tape 20 as described above, and reduced to a residue by drying in response to heater 28. The stepping motor (not shown) drives takeup reel 24 which results in the sample being transported to a position juxtaposed to the source - detector unit 30. During the period of interrogating a particular sample, the protons liberated from the nuclei thereof are detected by detector 38 and converted to output signals applied on leads 42 and 44 (FIG. 2). The amplitude of the output signals is indicative of the relative energy levels of the detected protons.

In laboratory operations these output signals may be analyzed by the nulling technique described above relative to FIG. 7, and for automated installations by the computer 86 as discussed relative to FIG. 4b.

In the mechanization shown in FIGS. 4a and 4b, the output signals from pulse height analyzer 58 are converted to binary coded decimal (BCD) signals in the formatting unit 73 and are decoded by computer 86 (FIG. 4b). The computer 86 may employ a least squares analysis program written for the elements of interest, and an iterative program may be employed for curve fitting.

In certain applications the selectable alpha energy filter 32 is programmed during a single sample period to resolve ambiguities resulting from interfering signatures. For example, nitrogen has a resonant plateau in the area of 4.5 MEV irradiating alpha particles, and interfering signatures may be distinguished by running two successive counts on a thin sample (less than 0.25 mg per sq. Cm), one with a sufficient absorber to reduce the alpha energy to just below the resonance, and the other with the absorber allowing the energy to be just above the resonance. Both the counting rate difference, and the spectral characteristics may be used to determine the contribution of the nitrogen element toward signatures.

It should be noted that the technique of exploiting strong resonances to resolve signature ambiguities is applicable to many elements other than nitrogen, and it is one of the significant advantages derived by thin sample analysis in accordance with the subject invention.

After the sample 25 has been analyzed as described above, the tape 20 is stepped toward the right (FIG. 1), is stamped with a time-date code by timer unit 46, and subsequently stored on takeup reel 24. The date stamp provides a continuous profile of a given application such as stream or river monitoring, and may serve as evidence relative to legal proceedings.

Thus there has been described a method and apparatus for utilizing alpha particle irradiation to analyze liquid residue samples. The method and apparatus of the subject invention drastically reduces the time required for a given measurement, and allows the simultaneous quantitative analysis of a plurality of constituent elements during a single test period.

Although the preferred embodiments have been described in detail herein, it will be apparent to those skilled in the art that the described method and apparatus relates not to a single device, but rather to a broad conceptual method for liquid residue analysis. The applications for automatic monitoring and in-line process control incorporating the subject invention described hereinabove are presented by way of example of the applications to which the subject invention is readily adaptable, but it is understood that numerous other applications and modifications of the method of the subject invention are within its scope.

What is claimed is:

1. A device for analyzing the relative quantity of selected elements in the residue of a sample, said device comprising:
   a source of alpha particles;
   means for positioning said residue for irradiation by said alpha particles;
   detector means disposed to intercept protons liberated by said alpha particles from the nuclei of said elements for producing electrical pulses the amplitude of which is a function of the energy of said detected protons; and
   analyzer means coupled to said detector means for counting the number of said electrical pulses within selected amplitude ranges.

2. The device of claim 1 wherein said selected elements are lighter than calcium and said analyzer means includes a pulse height analyzer coupled to said detector means for counting and storing the number of said electrical pulses within said selected amplitude ranges.

3. The device of claim 1 wherein said analyzer means includes a pulse height analyzer coupled to said detector means for counting and storing the number of said electrical pulses within selected amplitude ranges and for providing an output signal indicative thereof; and further comprising
   means for storing characteristic proton signature signals of said selected elements; and
   means for determining the relative quantity of said selected elements by analyzing the output signal of said pulse height analyzer against said stored signature signals.

4. The device of claim 3 wherein said means for storing characteristic proton signature signals comprises a signature spectrum generator; and said means for determining the relative quantity of said selected elements comprises a display device, and a summing circuit having input circuits coupled to said spectrum generator and to said pulse height analyzer and having an output circuit coupled to said display device.

5. The device of claim 1 wherein said analyzer means includes a pulse height analyzer coupled to said detector means for counting and storing the number of said electrical pulses within selected amplitude ranges and for providing an output signal indicative thereof; and further comprising
   a computer coupled to said pulse height analyzer for determining the relative quantity of said selected elements by analyzing the output signal from said pulse height analyzer relative to characteristic proton signatures of said selected elements stored within said computer.

6. The device of claim 1 wherein said means for positioning comprises a tape transport assembly including a feeder reel, a takeup reel, a tape disposed between said feeder reel and said takeup reel adapted for receiving said residue, and means coupled to said takeup reel for progressively feeding segments of said tape to a position juxtaposed to said source of alpha particles; whereby said tape and said residue deposited thereon are stored on said takeup reel.

7. The device of claim 6 further comprising a variable alpha particle energy absorber wheel disposed between said source of alpha particles and said tape for degrading the energy of the alpha radiation itself before it strikes the sample to be analyzed, and means for selectably positioning different segments of said absorber wheel between said source and said tape.

8. The device of claim 6 further comprising means for stamping a date-time code on said tape.

9. The device of claim 1 further comprising a container encompassing and supporting said source, said means for positioning, and said detector; and means for purging atmospheric gasses from said container.

10. The device of claim 1 wherein said source includes any radioactive isotope for radiating approximately 6 MEV energy alpha particles.

11. The device of claim 1 wherein said detector comprises a silicon barrier detector having an annular opening centrally formed therein with said alpha particle source disposed within said opening.

12. A system for monitoring the quantity of certain elements in a liquid, said device comprising:
means for periodically drawing samples of said liquid;
means coupled to said means for drawing samples, for forming residues from said liquid samples;
a source of alpha particles;
means for positioning said residue for irradiation by said alpha particles;
detector means disposed to intercept protons liberated by said alpha particles from the nuclei of said certain elements of said residue for providing electrical signal pulses, the amplitude of which are representative of the energy of said detected protons; and
analyzer means coupled to said detector for counting and storing the number of signal pulses within selected energy ranges and for providing an analyzer output signal indicative thereof.

13. The system of claim 12 further comprising means coupled to said analyzer means for transmitting said analyzer output signal; remotely located means for receiving said transmitted signal; and means for processing said received signal to derive data therefrom as to the quantity of said certain selected elements in said liquid.

14. The system of claim 13 wherein said means for processing includes a computer.

15. The system of claim 12 further comprising:
computer means coupled to said analyzer means for processing said analyzer output signal to derive data as to the quantity of said certain selected elements in said liquid;
means for storing an electrical model of the desired relative quantity of said certain elements in said liquid;
means for comparing said derived data to said model; and
means for indicating an alarm condition when said derived data deviates from said model by more than a preselected amount.

16. The system of claim 12 further comprising:
means coupled to said analyzer means for processing said analyzer output signal to derive data as to the relative quantity of said certain elements in said liquid;
means for storing a model of the desired relative quantity of said certain elements;
means for comparing said derived data to said model for providing a control signal as a function of the difference therebetween; and
means responsive to said control signal for varying the relative quantity of said certain elements in said liquid to more closely conform to said model.

17. A device for quantitatively analyzing selected elements of liquid samples applied thereto, said device comprising:
a source of alpha particles;
a tape transport assembly including a tape, a feeder reel and a takeup reel;
liquid feeder means for applying said liquid samples to said tape and for forming residue therefrom;
means coupled to said tape transport assembly for positioning said tape section containing said residue juxtaposed to said source of alpha particles; and
a detector disposed to intercept protons liberated by said alpha particles from the nuclei of elements of said sample for producing an output signal the amplitude of which is a function of the energy of said detected protons.

18. The device of claim 17 wherein said liquid feeder means includes means for drop-depositing said liquid samples on said tape, and a heater located adjacent to said tape.

19. The device of claim 17 wherein said tape is composed of a metallic material; and said liquid feeder means includes means for heating a portion of said tape, and means for atomizing said liquid on the heated portion of said tape.

20. The device of claim 17 wherein said liquid feeder means includes means for depositing said liquid on said tape to form a residue of a thickness less than ten per cent of the penetration range of the alpha particles radiated from said source.

21. A method for quantitatively analyzing selected elements in a liquid comprising the steps of:
forming a residue from said liquid;
irradiating said residue with alpha particles;
detecting protons liberated from selected light elements of said residue and providing electrical pulses representative of the energy level of said detected protons; and
analyzing said electrical pulses against predetermined electrical signatures of selected elements, whereby the relative quantity of said selected elements contained in said liquid is determined.

22. The method of claim 21 wherein said step of forming said residue includes depositing said liquid onto a tape and heating said tape.

23. The method of claim 21 wherein said step of forming said residue comprises atomizing said liquid onto a heated tape.

24. The method of claim 21 wherein said step of forming said residue comprises applying said liquid to a tape and said method further comprises the step of transporting the tape section containing said residue to a position juxtaposed to a source of alpha particles.

25. The method of claim 21 further comprising the step of selectively varying the energy level of said irradiating alpha particles.

26. The method of claim 24 further comprising the steps of date-time coding said tape, and of storing said tape.

27. The method of claim 21 further comprising the step of adding to said liquid a predetermined quantity of a selected element not normally contained in significant amounts therein.

28. A method for monitoring the quality of a body of liquid comprising the steps of:
periodically sampling said liquid;
forming a residue from each said sample;
irradiating said residue with alpha particles; and
detecting protons liberated from the nuclei of selected light elements of said residue and providing electrical signals representative of the energy level of said detected protons and indicative of the relative quantity of said selected light elements within said liquid.

29. The method of claim 28 further comprising the step of comparing said electrical signals against a stored group of characteristic signatures representative of the desired quality of said selected light elements in said liquid.

30. The method of claim 29 further comprising the step of providing an alarm signal when the quantity of said selected light elements in said liquid, as indicated by said comparison, deviates by more than a preselected amount from said group of stored characteristic signatures.

31. The method of claim 28 further comprising the steps of transmitting said electrical signals to a remote location and of receiving and analyzing said electrical signals at said remote location.

32. The method of claim 29 further comprising the steps of providing a control signal as a function of the results of said comparison, and of controlling the relative quantity of said selected light elements in response to said control signal.

* * * * *